(12) United States Patent
von Wendorff

(10) Patent No.: US 8,250,452 B2
(45) Date of Patent: Aug. 21, 2012

(54) METHOD AND APPARATUS FOR EMBEDDED MEMORY SECURITY

(75) Inventor: Wilhard von Wendorff, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1125 days.

(21) Appl. No.: 11/858,394

(22) Filed: Sep. 20, 2007

(65) Prior Publication Data

US 2009/0055602 A1    Feb. 26, 2009

Related U.S. Application Data

(63) Continuation-in-part of application No. 11/841,171, filed on Aug. 20, 2007.

(51) Int. Cl.
*G06F 11/10* (2006.01)
(52) U.S. Cl. .......................... 714/805; 711/164
(58) Field of Classification Search .............. 714/805, 714/811; 711/164
See application file for complete search history.

(56) References Cited

U.S. PATENT DOCUMENTS

| | | | | |
|---|---|---|---|---|
| 5,249,212 A * | 9/1993 | Covey et al. | | 714/765 |
| 5,848,076 A | 12/1998 | Yoshimura | | |
| 6,038,315 A | 3/2000 | Strait et al. | | |
| 6,564,322 B1 | 5/2003 | Jameson et al. | | |
| 6,606,707 B1 | 8/2003 | Hirota et al. | | |
| 6,883,077 B2 * | 4/2005 | Kimura et al. | | 711/164 |
| 6,971,041 B2 * | 11/2005 | DeSota et al. | | 714/6.1 |
| 7,051,200 B1 | 5/2006 | Manferdelli et al. | | |
| 7,194,636 B2 | 3/2007 | Harrison | | |
| 7,577,809 B2 * | 8/2009 | Bruner et al. | | 711/163 |
| 7,653,861 B2 * | 1/2010 | Kanai et al. | | 714/758 |
| 7,761,779 B2 * | 7/2010 | Kanai et al. | | 714/805 |
| 7,761,780 B2 * | 7/2010 | Kanai | | 714/805 |
| 2003/0018871 A1 | 1/2003 | March et al. | | |
| 2003/0140202 A1 | 7/2003 | LaBerge | | |
| 2004/0204003 A1 | 10/2004 | Soerensen et al. | | |
| 2005/0066245 A1 * | 3/2005 | Von Wendorff | | 714/732 |
| 2005/0268203 A1 | 12/2005 | Keays et al. | | |
| 2006/0123239 A1 | 6/2006 | Martinian et al. | | |
| 2006/0149852 A1 | 7/2006 | Schollmeier et al. | | |
| 2009/0055602 A1 | 2/2009 | von Wendorff | | |

FOREIGN PATENT DOCUMENTS

| | | |
|---|---|---|
| EP | 0 878 975 | 11/1998 |
| WO | 0073907 A1 | 12/2000 |

OTHER PUBLICATIONS

Office Action mailed on Sep. 13, 2010 in U.S. Appl. No. 11/841,171.
Final Office Action mailed on Mar. 2, 2011 in U.S. Appl. No. 11/841,171.

* cited by examiner

*Primary Examiner* — Stephen Baker
(74) *Attorney, Agent, or Firm* — Dicke, Billig & Czaja, PLLC

(57) ABSTRACT

A method and apparatus for embedded memory security is disclosed. One embodiment protects data in a memory block from unauthorized reading. When writing or reading data to or from the memory block an error correction code is used to calculate an ECC value, wherein the calculation of the ECC value is based on a combination of the data and a access identifier provided to the memory block prior to reading. The access identifier identifies the requesting program. A read error is signalled in case the calculated ECC value does not match a stored value thus indicating an access violation.

22 Claims, 1 Drawing Sheet

METHOD AND APPARATUS FOR EMBEDDED MEMORY SECURITY

CROSS-REFERENCE TO RELATED APPLICATIONS

This Utility patent application is a continuation-in-part of U.S. patent application Ser. No. 11/841,171, filed Aug. 20, 2007, which his incorporated herein by reference.

BACKGROUND

The invention relates to the field of executing software code in a reserved and protected area.

Conventional digital control systems in most cases include one central processor and memory, wherein the processor is the central element of the digital control system. The processor is the main computing unit of the digital control system and executes the program code, i.e. digital system control algorithms and/or programs defining the system behaviour. That is control algorithms and programs control the processor and include the commands to be executed by the processor as required by the program's purpose. The program is stored in the memory.

In this context the term program is used to describe executed software code, wherein the software may be executed in one instance or in more that one instance at the same time as so called tasks. Executed programs or tasks may be based on identical source code, but are executed in separate operation environments, i.e. each task has individually assigned resources such as memory, unless the executed programs or tasks intentionally access a shared resource. In the following the terms executed program or shortly program are used.

As there is only one processor in the system it has to coordinate the operation of various internal and peripheral system units. For controlling the system units the processor may execute more than one program at a time, wherein different vendors may provide the programs. As the one processor actually cannot execute two or more programs simultaneously, a time-sharing or time multiplexing method is used, which manages the processor to execute the different programs in consecutive short time slices, thus emulating a simultaneous execution.

Ideally each program executed in parallel to another should be programmed not to interfere with other programs, such that these may be executed in parallel. Although programs are tested thoroughly before put into production, there remains a slight risk that they do not behave as intended. However when these programs are developed and tested they usually are executed alone or in parallel to other programs on a system, but not always in exactly the same environment and operating conditions as in production. Hence the digital control system, for example, the operating system of the digital control system, should take care that a program executed in a time slice of a time multiplexing system leaves the environments, i.e. the resources associated with parallel executed programs, untouched. In one embodiment, a program currently executed should not read from a memory area assigned to a program, which is currently suspended.

In one conventional approach for providing an execution environment to a program all memory addresses are virtual memory addresses, which are translated into real memory addresses based on an individual task identifier. A translation table is set up in order to grant exclusive access to a memory range not shared between parallel executed programs, wherein the translation table for example requires registers specifying start and end of a protected memory range and a protected register stores the identifier of a program or task. This mapping of virtual to real memory addresses conventionally is performed by a memory management unit (MMU). Another conventional approach is the memory protection register. Similar to a MMU a set of registers describes start and end of a protected memory range and an individual identifier is used to separate between different programs executed in parallel, but there is no translation of virtual to real memory addresses.

Both above described solutions require additional registers for task/program management. Hence a novel method requiring fewer resources is needed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
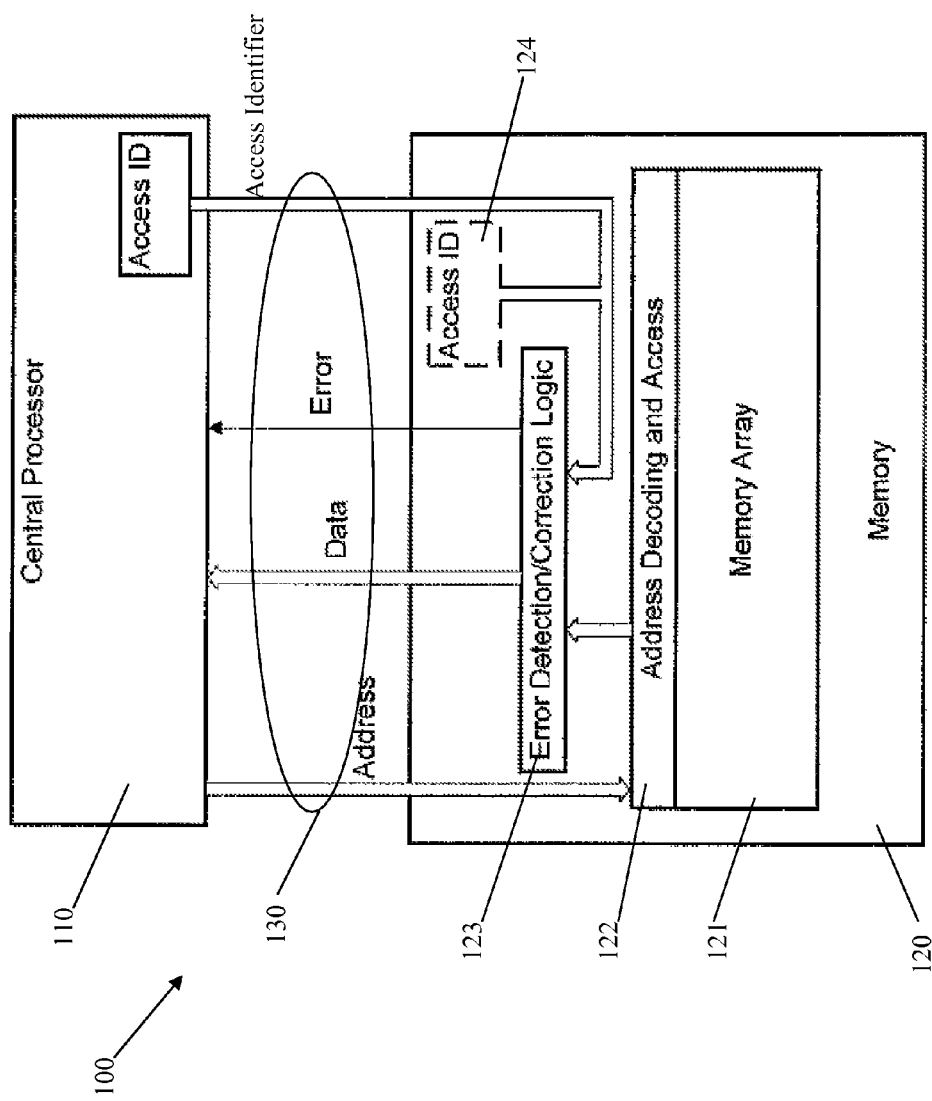
FIG. 1 illustrates a schematic of an apparatus according to the invention

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

In digital control systems various error detection and correction methods are used to detect and, if possible, correct data when reading data from memory. That is when reading data from memory a request is sent from the requesting device to the memory or a memory management unit (MMU) via a bus, wherein the request may specify an address and the amount of data to read from memory. The requesting device may be the central processing unit or any other device, e.g., a coprocessor, of the digital control system. Corresponding to the request the memory reads the data and performs an error correction code (ECC) on the data before sending the data to the requesting program or device. In case the error correction code does not find an error in the data or detects and corrects an error, then the data is sent out to the requesting device and a corresponding signal is sent to the device indicating the success of the read operation. In case the error correction code does find an error in the data as read, which cannot be corrected, then the memory signals that an error has occurred. The requesting device in this case will act accordingly, i.e. a central processing unit may stop its operation. In many cases such a read error signal will halt the whole system.

A commonly used technique is an error correction code (ECC) based on partial parity sums, which will be considered as one example in the following. Note that also other suitable error detection and correction methods/codes may be used. One characteristic of error detection and correction codes is the ability to protect $2^N-1$ bits, with N being the bit number of a calculated error correction code value. Considering the fact that microcontrollers or processors or other units are coupled to memory via busses having widths of $2^N$ bits, the used error detection and correction scheme is able to cope with a wider data range than the actual $2^N$ bits. For example for a data width of 64 bits, i.e. N=6, an error detection and correction scheme using N=6 bits covers $2^6-1=63$ bits and thus leaves one bit unprotected. Accordingly a scheme for N=7 will be implemented, which can cope with $2^7-1=127$ bits. That is the error detection and correction scheme actually implemented can handle significantly bigger data blocks than needed. In this example the error detection and correction scheme is able to handle a data width, i.e. a data block, of 127 bits length, which extends the required length by 63 bits.

These bits, which can be protected by the error correction code and which exceed the required length, will be used to limit the read access of programs executed on the digital control system to an individually assigned area in memory, thus protecting assigned memory areas from unauthorized read access.

When a program currently executed requests data from memory the read request transmitted to the memory not only specifies which data to read, but also specifies an access identifier identifying the requesting program. The memory uses the access identifier to check that the requesting program is authorized to read the requested data. The check is performed by combining the bits of the access identifier provided in the read request with the data read from memory and then performing an error correction method based on the combination of the data and the identifier. That is the memory will read the requested data from memory and combine the data with the identifier and then calculate an error correction code based on the combination. The calculated value is then compared to a stored error correction code. The result of the check will indicate an error, i.e. a mismatch between the calculated error correction value and the stored value, if the provided access identifier differs from the value used for calculating the error correction value when writing the data to memory. In this case the memory will signal a read error to the requesting device, which will react accordingly. Depending on the error correction code and on the type of combination of the access code and the data the signalled error can be traced back to either a bit error in the data as read from memory or a bit error in the provided access identifier. That is, if for example, the data as read and the provided access code are concatenated and the error correction code is able to locate the bit position of an detected error, then the error can be traced back to either a true read error or an error in the provided access provider, i.e. a mismatch between the identifier provided in the read request and the identifier used when writing the data.

In case the calculated error correction value matches the stored value the memory will signal the success of the processing of the read request to the requesting device and will furthermore transmit the requested data to the device.

In this way the error correction scheme is used to grant read access to data for which the requesting process can provide the matching access identifier. By using different access identifiers for different programs executed in parallel the scheme prevents these programs from reading data associated with another program, unless an identical access identifier is used for programs.

When writing data into memory, a device will also provide an access identifier together with the data to be stored. Basically the memory will perform the opposite process as described for a read access. That is the memory combines, for example concatenates, the data and the provided identifier and calculates an error correction value, which is then stored in the memory together with the data. The memory in this case will not check whether the provided identifier is allowed. However as the stored ECC value has been calculated using the provided identifier the device can be identified. It is apparent that other than the devices comprised in the digital control system may be used to calculate ECC values and to store these and corresponding data in memory, for example when initially writing data to memory for the very first time, i.e. when manufacturing the digital control system.

In the following this method and a related apparatus will be explained in more detail with regard to FIG. 1.

FIG. 1 illustrates a block diagram 100 including a central processor 110 coupled to a memory 120 by at least one communication means 130, wherein central processor 110 can be a conventional processor as used in a "system on chip" (SOC) or in a personal computer or microcontroller device, which for example is known from the automotive industry for controlling combustion engines. Although not explicitly illustrated in the drawing it is apparent that processor 110 includes further technical sub devices, for example such as internal registers, ports for transmitting and receiving data or instructions and at least one connection to a communication means 130.

Similarly memory block 120 includes sub devices as known from conventional memory blocks, for example a connection to a communication means 130 for receiving write or read instructions and for receiving and sending data to a requesting device, i.e. for exchanging data with central processor 110 in one example. Accordingly block 120 includes means for coupling to communication means 130. Memory block 120 furthermore includes a memory array 121 coupled to an address decoding and access logic 122, which in turn is coupled to error detection and correction logic 123 (ECC logic), and a storage unit 124. In one embodiment storage unit 124 can be accessed directly via communication means 130, i.e. bypassing the address decoding and access logic 122.

Communication means 130 in one exemplifying embodiment may be a conventional bus system for coupling a central processing unit (CPU) to a memory block. Alternatively communication means 130 may be a proprietary communication means providing the functionality as described further below.

The direction of data flow as indicated by the arrows relates to a read access of central processor 110. Note that the direction of the arrow "data" is reversed correspondingly when the central processor 110 or any other sub device issues a write data request to the memory.

For reading data from memory a requesting program provides an access identifier to memory block 120 prior to or with the first read request via communication means 130. In one embodiment the access identifier may be any binary data, which uniquely identifies the requesting program executed by the processor. In order to provide a program at start-up with its access identifier it may be hard coded in the executable program code or may be provided to the program for example from a configurable storage unit. The processor accordingly may have stored the access identifier associated with a currently executed program for example in a core register or in any other suitable storage unit.

The access identifier may be stored directly in storage unit 124 by the processor 110, i.e. bypassing any other sub device in memory block 120, as in one embodiment devices may directly access storage 124 in order to provide an access identifier to memory 120. Hence the requesting device may write an access identifier directly to storage unit 124 before issuing the actual read request.

Furthermore the device requesting on behalf of the executed program provides further information such as an address to memory block 120 as required for reading the requested data. The address decoding and access logic 122 processes the provided information, accordingly reads the data and an ECC value associated with the data from memory array 124 and provides both the data as read and the stored ECC value to ECC logic 123.

ECC logic will combine the data as read from memory array 121 with the provided access identifier, which may be read from storage unit 124 or which may be provided directly from central processor 110 to the ECC logic 123. In one embodiment the combination may be a concatenation. In variations other binary operations such as logical AND or logical OR or XOR or combinations thereof may be used to combine the data and the access identifier. ECC logic 123 will then calculate an ECC value based on the combination of the data and the access identifier. That is in case data and access identifier have been concatenated ECC logic 123 processes a block of data having the size of the concatenation. This type of combination allows to easily locate an error either in the data as read from the memory array 121 or in the access identifier. Otherwise, i.e. in case the data and the access identifier have been combined by any of the above listed binary operations the length of the combination does not exceed the length of the data, such that the ECC logic has to process a shorter block. In this case the ECC logic may be designed for processing the shorter blocks.

The ECC logic 123 then compares the calculated ECC to the ECC read from memory array 121. In case the values match ECC logic 123 signals to the requesting device that the read request has been processed successfully and transmits the data as read to the requesting device.

If the calculated ECC value does not match the ECC value read from memory array 121, i.e. ECC logic 123 detects an error, then the ECC logic may differentiate between different situations. In one embodiment, ECC logic may handle a detected error depending on the position of the error within the processed data block.

In one example, the data read from memory and the provided access identifier are concatenated. Accordingly a first portion of the processed data block reflects the access identifier and a second portion reflects the data as read. In case ECC logic 123 detects and locates at least one bit error in the access identifier, then the ECC logic interprets the error as an access violation, because the requesting program provided an invalid access identifier to memory 120. Accordingly the ECC logic will report an error to the requesting program, wherein the error notification may specify the access violation or in a variation may simply indicate a read error without specifying further details. Errors in the transmission of the access identifier from the requesting program to the memory are not considered. Furthermore in case the implemented ECC method allows correcting the bit error, the access password will not be corrected.

In case a bit error is detected and located in the data read from memory the error detection and correction logic 123 may correct the bit error in the data and may report a successful read operation. In this case the corrected data are transmitted to the requesting device/program. Depending on the specific type of the implemented ECC method one or more bit errors may be detected and corrected in the data.

Care has to be taken when choosing the length of the ECC code and the number of access identifier bits. The Hamming distance of the used ECC code should be greater than the number of access identifier bits. For single error correction and double detection scheme a Hamming distance of 4 is required, so that a maximum of 2 bits as access identifier can be handled without running into the problem of fault detection masking. Otherwise the proposed method cannot detect all possible situations of access violation because of error masking. That is in a system capable of detecting two bit errors and capable of correcting a single bit error a situation of three bit errors may be recognized as being a single error, because the errors mask themselves. This becomes difficult if one of the erroneous bits is located in the provided access identifier, such that the invalid access identifier may be accepted as being valid, because the erroneous bit is masked.

In this way the proposed method allows to protect each data block, i.e. each word, read from memory individually, namely in that the requesting program has to provide an access identifier to memory 120 when accessing the data, wherein the access identifier may allow access to only one data block of predetermined size.

However a memory location may be accessed by more than one program, wherein an access may be a read or write operation on the memory location. As a program has to provide the appropriate password identifier to memory 120 for successfully reading the data each program intending to read data from the memory location must provide this access identifier. This can be useful in case it is necessary to grant access to a memory location to more than one program. In one embodiment this can be achieved by including the necessary access identifier in each program accessing the shared memory location. In another example a specific library may be linked to each program accessing the shared memory, wherein the access identifier is provided by this library to the programs. Alternatively a specific register accessible to all programs may be declared, which may be a core register and which provides the required access identifier to each program.

Alternatively to enabling programs to provide a required access identifier to memory 120, there may be memory areas configured for which the error correction code checking does not require an access identifier. That is in one embodiment when accessing data from memory array 121 the ECC logic 123 recognizes a memory area, for example by its address, as being different and does not combine an access identifier with the data for error checking. Accordingly the ECC values of data read from this specific memory area are based on the data only, such that there is no check whether a valid access identifier has been provided.

In a further variation of the proposed method the device requesting data on behalf of a currently executed program may access the data from memory either as executable program code, which is to be executed by the processor, or as data to be processed in a processor, but not executed, i.e. for example configuration data. For differentiating between an access to executable code or configuration data the requesting device in the digital processing system may provide a sideband signal. As processors may read executable code via a first port and configuration data via a second port, the port number may be provided to memory 120 as a binary value. The digital sideband signal may then form at least part of an access identifier. In one embodiment ECC logic 123 uses the provided sideband signal as access identifier, so that this variation ensures the request has been sent via a specific port. In one embodiment, the provided sideband signal may be used as part of the access identifier, i.e. in addition to an access identifier explicitly provided by the currently executed program. In this case ECC logic 123 combines the data as read from memory array 121 and the sideband signal and the provided access identifier to a data block and calculates the ECC values based on this combination. It is apparent that the access identifier in a further variation may be a combination two or more portions, wherein the portions are combined in memory block 120.

FIG. 1 furthermore illustrates the hardware requirements for executing the proposed method. As most of the elements illustrated in the drawing are known from conventional systems a description of these is omitted here. For example a memory block 120 coupled to a bus system 130 enabling read and write access for data are known from conventional systems, wherein each read or write access involves an ECC logic to check for data integrity when reading and wherein ECC values are calculated correspondingly when writing data to memory array 121.

In addition to devices comprised in conventional digital processing system the memory block 120 may include at least one storage unit 124, in which the access password is stored. Storage unit 124 preferably may be access directly from outside memory 120, i.e. bypassing any address decoding and access logic, thus providing direct access to any sub device of the digital processing system, which may request to read or write data. Storage unit 124 preferably may also be accessible may ECC block 123, such that for reading an access password the address decoding and access logic 122 is bypassed. Furthermore storage unit 124 is coupled to ECC block 123 to enable the ECC block to read an access identifier. In one example the storage unit may be a register large enough to store a provided access identifier.

Furthermore the implemented ECC method is adapted to handle data blocks of a size resulting from a combination of the data as read from memory array 121 and an access identifier. For the above mentioned example assuming a data block size of 64 bits and an access identifier length of 63 bits, and wherein the data and the identifier are concatenated to a block, the implemented ECC logic is adapted to calculate ECC values for the data block size.

Furthermore memory block 120 may be adapted to combine a sideband signal and an access identifier and the data as read to a single data block and to calculate ECC values on this combination, wherein possible combinations of the data may be those binary operations as mentioned above.

Central processor 110 correspondingly may be adapted to provide a sideband signal identifying the requesting sub device, such that at least two paths for accessing data can be distinguished by the sideband signal.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A digital processing method including controlling access to data stored in a memory block comprised in a digital processing system, comprising:

providing an access identifier to the memory block prior to a read data request, wherein the access identifier identifies the requesting program;

calculating an error correction code (ECC) based on a combination of data read from the memory and the access identifier; and comparing the calculated ECC value to an ECC value associated with the requested data stored in the memory block.

2. The method of claim 1, wherein the combination of the data read from memory and the access identifier is a concatenation or a binary OR operation or a binary AND operation or a binary XOR operation or a combination of these operations.

3. The method of claim 1, wherein an ECC logic modifies the data in case of mismatch between a calculated and a stored ECC value.

4. The method of claim 1, wherein the digital processing system is comprised in an engine management system.

5. The method of claim 1, comprising:
splitting the access identifier into at least two portions; and combining the portions in the memory block.

6. The method of claim 5, wherein one portion of the access identifier identifies the device in the digital processing system requesting the read data request.

7. The method of claim 5, comprising providing the device requesting the read data request the access identifier to the memory block.

8. The method of claim 7, comprising providing the requesting device the access identifier to the memory bypassing a regular address decoding logic in the memory.

9. A method for digital processing including writing data to memory in a digital processing system, comprising:

providing an access identifier identifying a requesting program prior to a write data request;

calculating a first error correction code (ECC) value based on a combination of data provided to the memory and the access identifier;

storing the calculated first ECC value in the memory; and comparing the stored first ECC value to a second ECC value calculated when again accessing the data.

10. The method of claim 9, wherein the digital processing system is comprised in an engine management system.

11. The method of claim 9, comprising:
splitting the access identifier into at least two portions; and combining the portions in the memory block.

12. The method of claim 11, wherein the combination of the data read from memory and the access identifier is a concatenation or a binary OR operation or a binary AND operation or a binary XOR operation or a combination of these operations.

13. The method of claim 11, wherein one portion of the access identifier identifies the device in the digital processing system requesting the write data request.

14. The method of claim 13, comprising providing the device issuing the write data request the access identifier to the memory block.

15. The method of claim 14, comprising providing the issuing device the access identifier to the memory bypassing a regular address decoding logic in the memory.

16. A digital processing system comprising:
at least one device requesting from a memory block, via a communication means; write data or read data requests;
wherein the device is adapted to provide an access identifier to the memory block; and
wherein the memory block comprises an error correction code (ECC) logic, and wherein the ECC logic is adapted to calculate an ECC value based on a combination of the data and the access identifier and compare the calculated ECC value to an ECC value associated with the requested data stored in the memory block.

17. The system of claim 16, wherein the ECC logic is adapted to directly read and write the access identifier to a storage unit bypassing an address logic.

18. The system of claim 16, wherein the device requesting the read or write operation comprises a means for storing the access identifier.

19. The system of claim 18, wherein the means for storing the access identifier is a core register in a central processing unit comprised in the system.

20. The system of claim 16, wherein the device requesting the read or write operation is adapted to provide an identifier identifying the device as a first portion of the access identifier to the memory block and at least a second portion of the access identifier.

21. The system of claim 20, wherein the memory block is adapted to merge the at least two access identifier portions into one access identifier.

22. The system of claim 21, wherein the merge operation is one of a concatenation or a binary AND or a binary OR or a binary XOR operation or a combination of these operations.

* * * * *